Jan. 10, 1939.  W. R. GRISWOLD  2,143,312
MOTOR VEHICLE TRANSMISSION
Filed April 6, 1934   3 Sheets-Sheet 3
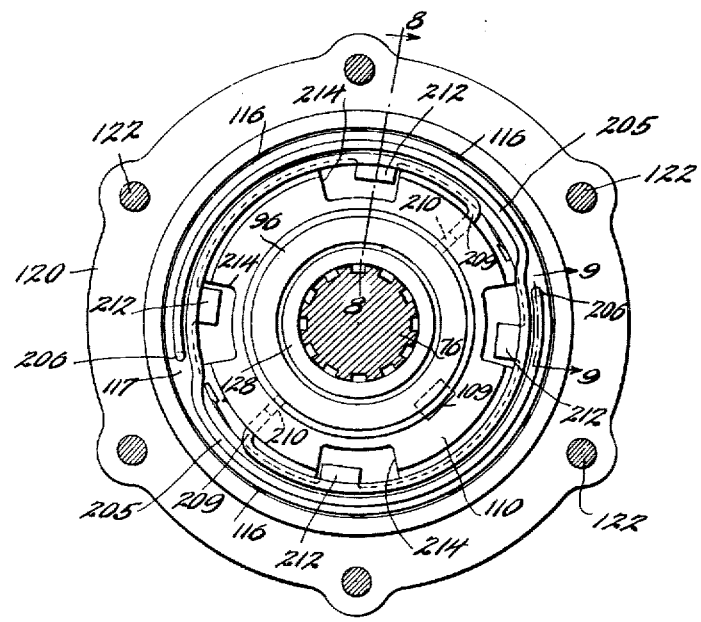
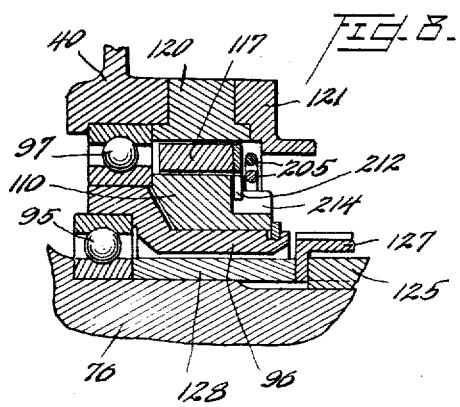
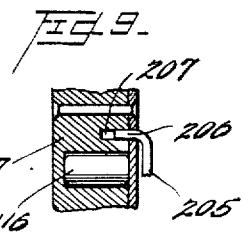

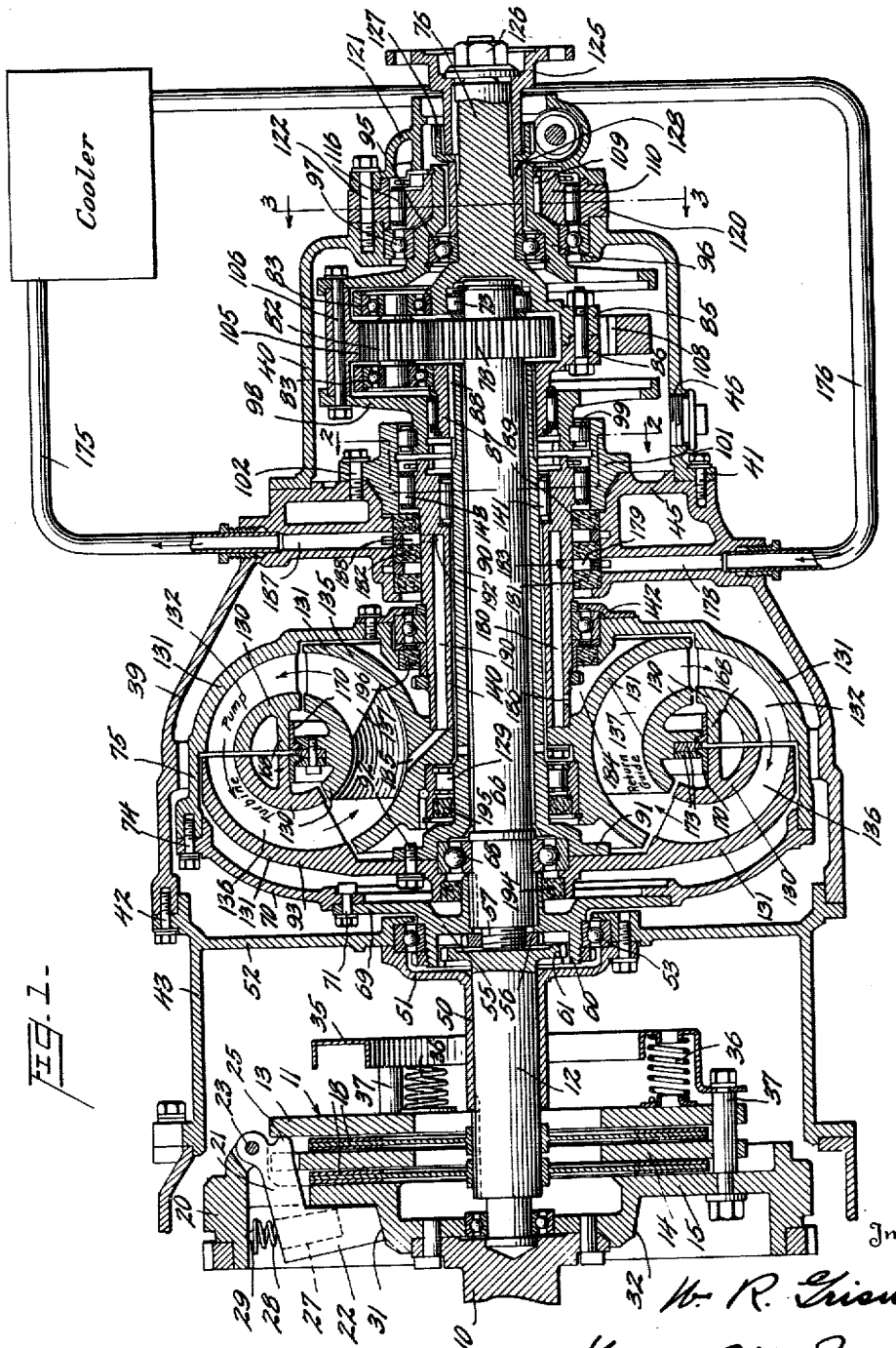

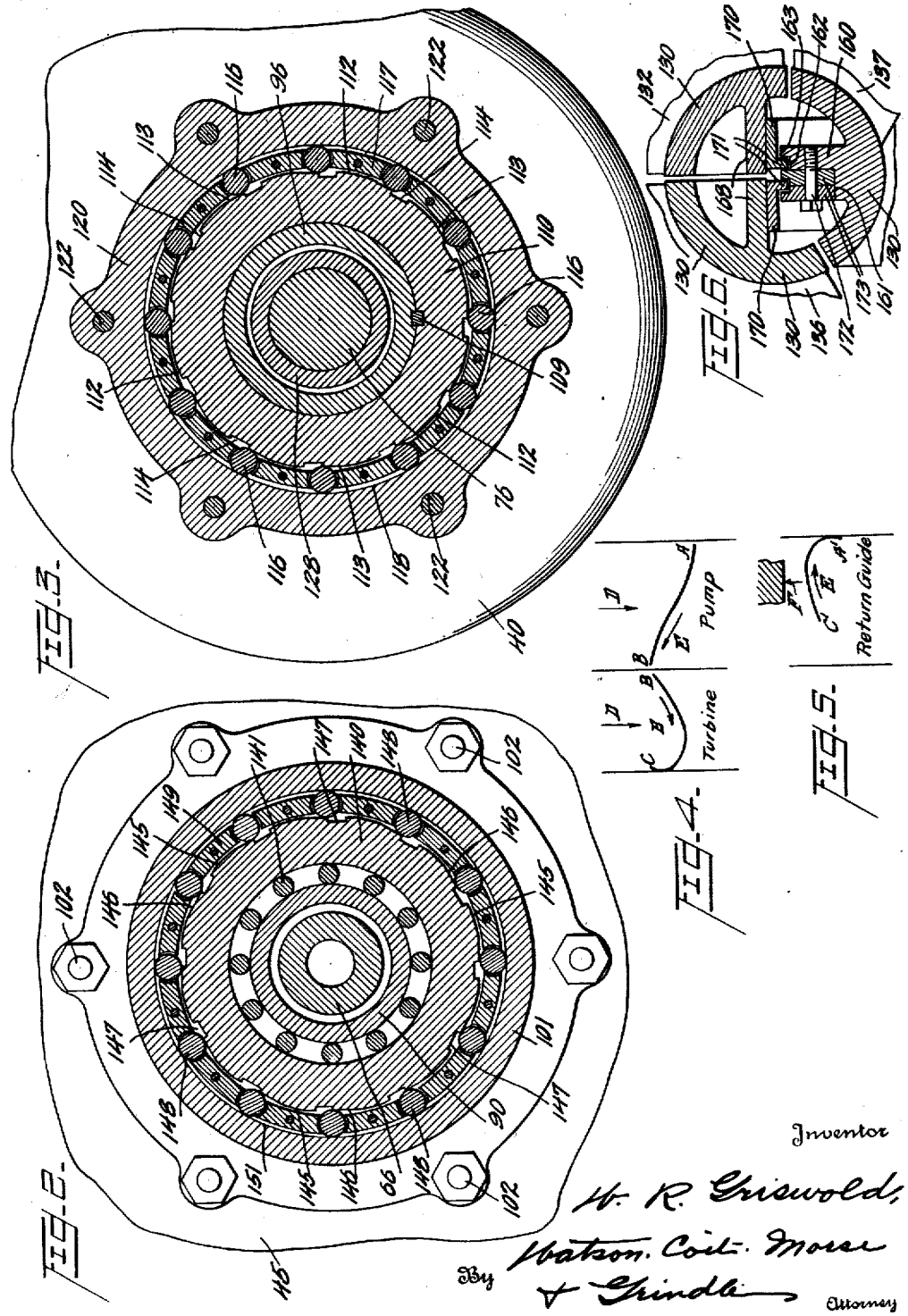

Patented Jan. 10, 1939

2,143,312

UNITED STATES PATENT OFFICE 2,143,312

MOTOR VEHICLE TRANSMISSION

Walter R. Griswold, Detroit, Mich., assignor to Packard Motor Car Company, Detroit, Mich., a corporation of Michigan Application April 6, 1934, Serial No. 719,397

10 Claims. (Cl. 74—189.5)

This invention relates to improvements in power transmitting mechanism and more particularly to variable speed transmission mechanism for motor vehicles. It is the principal object of the invention to provide a transmission affording the usual range in speed variation in which the proper speed ratio is automatically controlled by operating conditions, requiring no attention on the part of the vehicle operator.

It is a more specific object of the invention to provide a change speed transmission for motor vehicles embodying a positive reduction drive affording a low speed ratio and a variable speed transmission affording the higher speed ratios between the driven and the driving shafts. In the preferred form of the invention the low ratio positive drive is effected through a planetary gear train, and a device which may be generally described as a slip clutch is so connected to this planetary train as to operate the driven shaft at a higher speed ratio when additional speed is demanded by operating conditions, the torque transmitted through the slip clutch acting through the planetary gear train and being superimposed upon the positive drive. The slip clutch is preferably constituted by a fluid pump and a turbine operable by fluid discharged from the pump, the pump and turbine being operatively associated with the driving and driven elements respectively of the transmission.

A further object of the invention is the provision in a motor vehicle of a change speed transmission of which the speed ratio is automatically variable in response to variation in the speed-torque ratio of the driven shaft, the motor being connected with the transmission by means of a clutch of the speed responsive type, the latter functioning only when the motor is operated above the idling speed. It will be observed that a transmission of this type is purely automatic, it being only necessary to control the speed of the motor in order to operate the vehicle, any acceleration of the motor serving to initiate the drive of the vehicle and the speed ratio of the transmission being selected automatically in accordance with operating conditions.

A further object of the invention is the provision of a novel form of fluid pump-turbine system which, by reason of its compactness and relatively light weight, is particularly adapted for use in a motor vehicle.

Further objects and features of the invention will be apparent from the following description taken in connection with the accompanying drawings, in which Figure 1 is a longitudinal sectional view of a change speed transmission constructed in accordance with the present invention;

Figures 2 and 3 are enlarged sectional views taken on the lines 2—2 and 3—3 respectively of Figure 1 and illustrating details;

Figures 4 and 5 are diagrammatic views indicating generally the axial curvature of the vanes within the pump-turbine unit;

Figure 6 is an enlarged fragmentary sectional view of a constructional detail of the pump turbine unit illustrated in Figure 1;

Figure 7 is an end elevation of the structure shown in Figure 3 with certain parts removed;

Figure 8 is a fragmentary sectional view taken substantially on the line 8—8 of Figure 7; and Figure 9 is a fragmentary sectional view taken substantially on the line 9—9 of Figure 7.

For convenience in describing the invention reference will be made hereinafter to the form thereof shown in the drawings for the purpose of illustration and specific language will be employed to describe the several elements of the construction. It will nevertheless be appreciated that by the use of such language no limitation of the scope of the invention is intended and that various alterations and modifications of the preferred arrangement are contemplated.

In Figure 1 of the drawings the rear end of the motor shaft is shown at 10, this shaft being coupled by means of a clutch indicated generally at 11 with a coaxial shaft 12, which may be referred to for convenience as the driving shaft of the transmission. The clutch 11 is preferably of the speed responsive type and may comprise the usual series of plates 13, 14, and 15 rotatable with the motor shaft 10, the plate 15 forming the web portion of the flywheel of which the rim is indicated at 20, and the interposed friction discs 18 keyed or otherwise secured to the shaft 12. The plates 14 and 15 are recessed at a plurality of points about the peripheral portions thereof to permit the passage therethrough of arms 21 carrying weight members 22, each arm being pivoted as indicated at 23 to the flywheel rim 20. Each arm 21 is further provided with a rearwardly directed projection 25 engaging the forward face of the plate 13 and each weight member 22 is recessed as at 27 to receive a coil spring 28, the latter being provided with a seat 29 having rocking engagement with the inner face of the flywheel rim 20. The lower end of each weight member 22 is provided with a flat face 31 engaging a cooperating annular face 32 on the plate 15 to limit inward movement of the weight members in response to the action of the associated springs 28.

Conventional means is provided for normally engaging the plates 13, 14, and 15 with the friction disc 18, this means including an annular member 35 supported on the flywheel web 16 by the usual bolts 37 extending through the clutch plates 13 and 14 and supporting the latter for axial movement. A plurality of coil springs 36 act between the member 35 and the plate 13 to urge the latter forwardly.

The operation of the clutch will be readily understood from the foregoing description. The force exerted by the springs 36 tending to engage the clutch is normally insufficient for that purpose, the action of these springs being resisted by the action of the springs 28 which, through the weight members 22 and the projections 25 serve to maintain the plate 13 in the rearward position, in which it is shown in Figure 1 of the drawings, so long as the motor is stationary or rotating at idling speed. When the speed of the motor is increased beyond idling speed, the weight members 22 move outwardly under the action of centrifugal force, compressing the springs 28, and permitting the plate 13 to move forwardly under the action of the springs 36, thus engaging the clutch and operatively connecting the motor shaft 10 and the driving shaft 12.

It will be appreciated that while the clutch illustrated in the drawings, or some other form of speed responsive clutch, is preferred in connection with the transmission disclosed herein in order that the operation of the transmission may be entirely automatic, a conventional manually operable clutch may be employed if completely automatic operation is not desired.

Referring now to the variable speed transmission mechanism, it will be observed that this mechanism is enclosed in a housing comprising two sections 39 and 40 which are rigidly secured together as at 41, the forward section 39 of the housing being in turn secured as indicated at 42 to the usual clutch housing 43. The two sections 39 and 40 of the transmission housing are separated by the rear end wall 45 of the forward section 39, the section 40 of the transmission housing being thus isolated so that it may be partially filled with lubricant supplied through the opening 46 to ensure adequate lubrication of the gearing housed within this section.

The driving shaft 12 extends adjacent its rear end through a sleeve 50, the latter being provided with a radially disposed flange portion 51 which is secured to the end wall 52 of the clutch housing 43. A bearing 53 supported in the end wall 52 affords a journal support for a member 55, the latter being retained in position with respect to the bearing by means of a nut 56 threaded on a forwardly directed hub portion 57 of the member.

The member 55 is provided with an internally toothed portion 60, with which is operatively engaged a toothed flange 61 formed on the shaft 12. This arrangement serves to connect the members 55 and the shaft 12 for unitary rotation and since the cooperating toothed portions 60 and 61 are only loosely engaged, any inaccuracy in axial alignment of the shaft 12 and of the member 55 will not cause unnecessary wear of the bearings supporting these members, proper alignment of the elements of the clutch 11 being thus ensured.

The member 55 is keyed or otherwise rigidly secured to the forward end of a shaft 66. Thus the adjacent ends of the shafts 12 and 66 are adequately supported for rotation within the housing structure and are so connected that they form in effect a single driving shaft for the transmission. At the rearward end thereof the shaft 66 is journalled in a bearing 73 supported in a driven shaft 76, the latter being in turn journalled in the section 40 of the transmission housing in a manner hereinafter explained. Adjacent the bearing 73 the shaft 66 is provided with a pinion 78 which is rigidly secured thereto.

The member 55 is further provided with a circumferentially extending flange portion 69 secured as at 71 to an annular member 70 which is in turn secured as at 74 to a second annular member 75 which functions as a fluid pump. It will be observed that the driving shafts 12 and 66, the pump unit 75, and the pinion 78 all rotate as a unit with the motor shaft when the clutch 11 is engaged, these elements constituting the driving parts of the transmission.

Referring now to the gearing, preferably of the planetary type, in the section 40 of the transmission housing, it will be observed that this gearing is illustrated in the drawings as comprising one or more planet gears 82 meshing with the driving pinion 78. Any convenient number of planet gears may be provided, for instance three, and these gears are each supported for rotation on the respective axes thereof in bearings 83 which are in turn supported in a planet carrier 85, this carrier embracing the pinion 78 and the gears 82 in the usual manner and being formed in two sections secured together as indicated at 86 for convenience in assembly. The rearward section of the planet carrier 85 is rigidly secured to or formed integrally with the driven shaft 76 and the forward section of the planet carrier is formed to provide a hub portion 87 which is keyed as at 88 to a sleeve 90, the latter loosely surrounding the shaft 66 and being provided at its forward end with a flange portion 91 secured as at 92 to an annular member 93, the latter constituting a turbine unit which cooperates with the pump unit 75 in a manner hereinafter explained. The journal support for the forward end of the sleeve 90 is afforded by bearing 68 carried by the forward end of the shaft 66. The rearward end of the sleeve 90 is supported in the hub portion 87 of the planet carrier 85 which is in turn carried by the driven shaft 76. The driven shaft 76 is journalled in a bearing 95 supported within a member 96, the latter being in turn journalled as indicated at 97 in the section 40 of the transmission housing. It will be observed that by means of this construction adequate bearing support is afforded for the driving and driven shafts, the sleeve 90, and the parts associated therewith.

An annular member 98 is supported in a bearing 99 within a member 101, the latter being secured to the rear end wall 45 of the section 39 of the transmission housing as indicated at 102. Supported by and between the members 96 and 98 is an annular orbit gear 105, rigid connection between these parts being preferably effected by means of bolts 106 passing through the members and through the gear. The internally toothed portion 108 of this orbit gear meshes with the several planet gears 82 and normally affords a fulcrum therefor, the planet gears 82 revolving about the axis of the shafts 66 and 76 and within this orbit gear, when the shaft 66 and pinion 78 are rotated, to drive the planet carrier 85 and the shaft 76 associated therewith in the same direction and at a reduced speed. Thus the member 96 which carries the orbit gear 105 may be keyed as at 109 to an annular member 110, the latter forming a part of a one-way brake acting between the transmission housing and the orbit gear to resist rotation of the latter in one direction only, that direction being opposite to the direction of rotation of the driving shaft 66. One form of such a brake is shown more particularly in Figures 3, 7, 8, and 9 of the drawings, it being understood that other types of one-way brake may be employed if desired.

Thus in Figure 3 the member. 110 is illustrated as provided with a peripheral portion comprising a plurality of substantially cylindrical surfaces 112 concentric with the axis of the shaft, a plurality of flattened surfaces 113 inclined with respect to a plane tangent to the adjacent cylindrical surface 112 on the line of intersection of the latter with the flattened surfaces 113, and a plurality of recesses 114 formed intermediate the cylindrical extremities of the flattened portions 113. A plurality of cylindrical rollers 116 are carried in an annular support 117, these rollers contacting with the inner cylindrical surface 118 of an annular member 120, the latter being confined between a housing 121 and the rear end wall of the section 40 of the transmission housing and being secured to both by means of bolts 122. One roller 116 is provided for and coacts with each of the flattened surfaces 113 on the member 110 and it will be observed that the construction is such that when the member 110 and the orbit gear 105 to which it is secured are turned in a counterclockwise direction as viewed in Figure 3, the rollers 116 will fall within the recesses 114 and thus offer no obstruction to such rotation. If, on the contrary, the orbit gear 105 and the member 110 tend to rotate in a clockwise direction as viewed in Figure 3, each of the rollers 116 will ride up the associated flattened portion 113 of the member 110 and thus become wedged between these surfaces and the inner cylindrical surface 118 of the member 120 which is fixed, thus locking the orbit gear against rotation in one direction.

Means is preferably provided to yieldingly urge each of the rollers 116 toward wedging or clutching position so as to ensure that the orbit gear 105 will be locked against rotation promptly on rotation in a clockwise direction of the member 110. This means is shown more particularly in Figures 7 to 9 inclusive and may comprise one or more spring elements 205, two such elements being shown in the drawings. Each of the elements 205 lies adjacent the rear face of the annular roller support 117 and is provided with an axially directed end portion 206 fitting within a recess 207 in the roller supporting member. The opposite end of each of the spring elements 205 is directed inwardly as indicated at 209 and seats in a recess 210 formed in the member 110. These spring elements are so constructed that they normally tend to contract so as to move the supporting member 110 in a counterclockwise direction as viewed in Figure 3, thereby carrying the rollers 116 toward the wedging positions.

When the member 110 is turned in a counterclockwise direction as viewed in Figure 3 the frictional engagement of the rollers 116 with the inner cylindrical surface 118 of the annular member 120 is sufficient to retard the movement of the rollers and the support 117 so that the rollers move toward the recesses 114, movement of the rollers in this direction being limited by a plurality of inwardly directed lugs 212 formed on the support 117 and extending within corresponding arcuate recesses 214 formed in the member 110.

It will be understood that the driven shaft 76 may be coupled to a plate 125 forming a portion of the conventional universal joint, the plate 125 being keyed to the shaft and retained in position thereon by means of a nut 126. A speedometer drive gear 127 may also be mounted on the shaft between the plate 125 and a sleeve 128, the latter abutting at its forward end against the bearing 95. These details form no essential part of the invention.

Returning now to the pump unit 75 and the turbine unit 93, it will be observed that each of these is of substantially annular shape and that each is provided with inner and outer walls designated by the numerals 130 and 131 respectively affording fluid passages therebetween, these walls being formed integrally with and supported in spaced relation by vanes 132 further defining the individual, circumferentially arranged passages. A cooperating fluid guide member 135 is also provided, this guide member being similarly formed to provide inner and outer walls designated 130 and 131 respectively and being journalled on the sleeve 90 as indicated at 129. The inner and outer walls of the turbine unit 93 and of the return guide unit 135 are similarly each provided with vanes 136 and 137 preferably formed integrally with these walls and extending therebetween.

It will be observed that the inner walls 130 of all three of the units mentioned form together a substantially complete annulus of toric shape coaxial with the driving shaft 66 and surrounding the latter. A suitable number of vanes are associated with each of these units, the vanes of each unit being substantially uniformly disposed about the axis of the shaft 66. Thus the vanes of the three units form a series of passages about the central tore 130 so that if the units were stationary, fluid might conceivably be passed between adjacent vanes in each of the three units to execute a complete circuit as indicated by the arrows in Figure 1. During such circulation the fluid would not only pass completely about the central tore formed by the inner walls 130 of the units but would also partake of movement of small extent in each of the units circumferentially of the shaft 66, the vanes being inclined to provide for this circumferential movement as will be fully understood from a knowledge of conventional pump or turbine construction. Thus if the pump unit 75 is rotated about the axis of the shaft 66, fluid will be forced through each of the passages defined by the vanes 132 and as the result of inclination of the latter into the adjacent and communicating passages defined by the vanes 136 in the turbine unit 93 and from thence into the passages between the vanes 137 in the return guide unit 135, the latter merely serving to redirect the fluid from the turbine unit to the pump unit. Obviously, if the pump unit 130 be rotated about the axis of the shaft 66 at any given speed, the turbine unit 93 will be urged to rotate in the same direction by the action of the fluid delivered thereto by the pump unit and by the inclination of the vanes of the turbine unit, and the speed of rotation of the turbine unit as compared with the speed of rotation of the pump unit will depend largely upon the resistance offered to rotation of the turbine unit. Thus when the pump unit is rotated at a relatively high rate of speed, and the load on the turbine unit is relatively low, the two units will rotate in a ratio approaching unity, the system functioning as a slip clutch, and the extent of slippage being determined by the load placed on the turbine unit and the speed of the pump unit.

In Figures 4 and 5 a rough diagrammatic illustration is given of the general direction of movement, circumferentially of the shaft, of the fluid in passing through the three units. Thus the lines AB and BC in Figure 4 represent generally the curvature as measured circumferentially of the shaft 66 of adjacent vanes in the pump and turbine units respectively, and in Figure 5 the line C'A' represents an adjacent vane in the return guide. The direction of movement of the vanes of the pump and turbine units shown in Figure 4 as these units rotate about the axis of the shaft 66 is indicated by the arrows D and the direction of movement of the fluid in an axial direction past the vanes is indicated both in Figures 4 and 5 by the arrows E, the arrows E lying in each instance adjacent that face of the vane against which the principal thrust in a circumferential direction is exerted when the torque-speed ratio of the system comprising the three units is relatively high, in other words, when a fairly heavy load is being driven by the turbine unit.

It will be appreciated that the direction of inclination of each of the vanes shown in these figures at their discharge end does not necessarily represent the absolute direction of the fluid passing over the vanes. Thus if a load is applied to the turbine unit so that it rotates more slowly than the pump unit, the fluid will be carried forwardly with the pump vanes and a circumferential component of motion will thus be imparted to the fluid which will be added to the component of motion imparted thereto by the actual inclination of the vanes, so that fluid leaving the pump vanes will be directed against the rearward face of the turbine vanes as indicated in Figure 4. Similarly, so long as the turbine is not rotating very rapidly about the axis of the shaft 66, the fluid leaving the discharge end C of each turbine vane will impinge on the leading face of the return guide vane as shown by the arrow E associated with that vane, and thus a force will be applied to the vane tending to rotate the return guide unit in a direction opposite to the direction of rotation of the pump and turbine units. This reverse motion of the return guide unit is resisted by means hereinafter described which permits forward movement of the return guide unit in the direction of rotation of the pump and turbine units, the construction being represented diagrammatically by the arrow F in Figure 5.

As the speed of the pump and turbine units increases and the torque applied to the turbine unit decreases, so that the slippage between these units becomes less, the fluid leaving the vanes of the turbine unit at the point C will have an increasing component of motion in the direction of movement of the turbine unit and eventually this component is such that the fluid leaving the vanes of the turbine unit will strike the vanes of the return guide unit on the reverse side, tending to rotate the latter unit in the same direction as the turbine and pump units. Since this movement is permitted, all three units may rotate as one when the proper relation of speed and torque is established, and it is theoretically possible to establish a condition in which there is no movement of fluid about the central tore formed by the walls 130 of the three units, with resultant elimination of friction due to fluid flow in the passages of the several units. While it is doubtful that this condition is attained in practice, it will be appreciated that the friction due to fluid flow through the several units is materially decreased when the units are operated under conditions of high speed and low torque by permitting all three units, including the return guide unit, to rotate together.

Referring now to the means for retaining the return guide unit 135 against rotation in one direction only, it will be observed that this unit is secured rigidly to a sleeve 140 which surrounds the sleeve 90 and is journalled thereon by means of a bearing 141, the rear wall of the pump unit being in turn journalled on the sleeve 140 as indicated at 142. The sleeve 140 is provided on the periphery thereof with a plurality of cylindrical surfaces 145, flattened surfaces 146, and recesses 147, the construction being similar to that hereinbefore described with reference to the member 110 shown in Figure 3 of the drawings. Rollers 148 supported in a carrier 149 engage with the cylindrical interior surface 151 of the member 101, the latter being secured to the rear wall 45 of the section 39 of the transmission housing as hereinbefore explained.

The similarity of the constructions shown in Figures 2 and 3 will be at once apparent, the arrangement being such as to prevent rotation of the member 140 and of the return guide unit 135 while permitting free movement of that member in the direction of rotation of the driving shafts 12 and 66 and of the pump and turbine units.

The operation of the transmission will now be readily understood. Assuming the vehicle to be stationary and the motor to be rotating at idling speed, all of the operating members shown in Figure 1 to the right of the flywheel and clutch 11 will be stationary. If the motor is now accelerated, the cooperating elements of the clutch 11 will engage and torque will be transmitted through the driving shafts 12 and 66 to the pinion 78. Rotation of the pinion 78 will cause rotation of the planet gears 82 on their own axes and will also cause these planet gears to revolve in the direction of rotation of the shaft 66 about the axis of the latter, and thus the planet gear carrier 85 will be rotated in the same direction at a reduced speed to set the vehicle in motion. For convenience the transmission when thus operated may be said to be operating in low ratio, it being understood that this term is employed to briefly describe the ratio of speed of the driven shaft to the speed of the driving shaft as being less than unity.

During this operation the torque transmitted through the mechanism will ordinarily be relatively high and the speed relatively low and consequently little or no torque is developed by the action of the pump unit 75 and the turbine unit 93, although it will be observed that any torque thus developed is actually employed to assist in the driving of the vehicle owing to the connection between the turbine unit 93 and the driven shaft 76 through the sleeve 90 and the plant carrier 85. As the speed of the vehicle increases, the torque developed by the pump-turbine unit increases, and when this torque exceeds the torque transmitted to the driven shaft 76 by the planetary gear train, the turbine unit 93 will tend to rotate at a speed correspondingly greater than that imparted to the driven shaft 76 by the gearing alone. The orbit gear 105 will now be caused to rotate slowly in the direction of rotation of the driving and driven shafts and the speed of the driven shaft will be correspondingly increased, a higher speed ratio between the driving and driven shafts being thus established. As the speed-torque ratio of the driven shaft continues to increase, slippage between the pump and turbine units will be further decreased, and the speed of rotation of the orbit gear 105 about its axis will be correspondingly increased. If it were possible to establish a condition in which no slippage existed between the pump and turbine units, these units rotating in unison, the driving shaft 66, the pinion 78, the orbit gear 105, and the driven shaft 76 would all rotate at the same rate of speed, a 1:1 ratio being established between the driving and driven shafts. In actual practice some slippage will occur in the pump-turbine units and a ratio approaching unity will be established. This ratio will of course be established with the vehicle travelling on a flat road bed at high speed, and the maximum speed possible under such conditions is attained by reduction of friction in the fluid clutch to a minimum as hereinbefore explained, all three units of this clutch rotating in the same direction and at substantially the same speed.

It is a significant feature of this mechanism that a positive drive is attained when the transmission is functioning in the low speed, no reliance being placed on the fluid clutch to ensure initial movement of the vehicle. Thus if the vehicle becomes mired or if it is necessary to start the vehicle on an extremely steep grade, the positive drive may be relied on to develop the necessary torque. The fluid clutch functions only to propel the vehicle when the torque speed ratio of the driven shaft is relatively low. Furthermore, it will be observed that numerous speed ratios are available over the entire range which is customary in a motor vehicle, that ratio being automatically established which is most appropriate to operating conditions, the torque transmitted by the fluid clutch being superimposed upon the torque transmitted positively through the planetary gear train. Thus the planetary gear train may be considered as comprising or constituting a one-way or over-running clutch, the drive being transmitted through the clutch when the torque is high. As the speed increases and the torque decreases, the driven shaft is rotated ahead of this clutch by the action of the pump turbine unit.

It should be noted that the mechanism is actually capable of automatically establishing any one of an infinite number of speed ratios between the driving and driven shafts so as to properly accommodate the applied load. In this connection it may be pointed out that a simple and conventional slip clutch, while permitting the two shafts between which it is interposed to rotate at different speeds, is incapable of establishing any useful and definite speed ratio between these shafts since the torque transmitted to the driven shaft by such a clutch must always be considerably less than the torque applied to the clutch by the driving shaft, except when the clutch is fully engaged. Thus the principal purpose of establishing different speed ratios in automobile transmissions is to derive therefrom an increased leverage or torque ratio, and the pump-turbine unit employed in the instant mechanism is described in this sense as a torque multiplying unit, i. e., a unit which is capable of delivering greater torque than is supplied to it.

It will be appreciated that the three units of the fluid clutch must necessarily be spaced to some extent to permit of relative rotation thereof and to afford clearance for expansion of the several units when heated. It is desirable, however, to reduce to a minimum the flow of fluid from one of these units to another except through the fluid passages provided therefor. For this purpose the construction shown in Figure 1 and in the enlarged view of Figure 6 may be employed. Thus the inner wall 130 of the return guide unit 135 may be provided with an outwardly directed annular projection 160, shaped on the periphery thereof to form three cylindrical surfaces 161, 162, and 163. The inner walls 130 of the pump unit and turbine unit are provided with axially and oppositely directed flange portions 168, the inner faces of which afford substantially cylindrical surfaces coaxial with the shaft 66. Annular bands 170 are secured within the flange portions 168 for instance by being forced within the cylindrical surfaces thereof, and each of the bands 170 is provided with an inwardly directed annular projection 171.

Annular members 173 are secured to the annular projection 160 on the inner member 130 of the return guide, for instance by means of bolts 172 to afford with the projection 160 annular recesses receiving somewhat loosely the projections 171 on the members 170. While it may not be desirable to provide an accurate fit between the cooperating parts just described, for obvious reasons, this construction provides a tortuous path between the several units serving as a seal for all practical purposes and reducing leakage of fluid from one unit to another to a minimum.

During operation of the vehicle the fluid employed, which may comprise glycerin, oil, or any substance of which the viscosity is not varied greatly by changes in temperature, will become heated due to friction in the several passages and between the several units. It is thus desirable to cool this fluid in order to maintain a fairly uniform temperature and in Figure 1 of the drawings a cooling device is illustrated diagrammatically, this device being supplied with the clutch fluid by means of conduits 175 and 176. It will of course be appreciated that the cooling unit will be located wherever convenient and that the disposition thereof in the diagrammatic representation in the drawings is of no significance. Furthermore, the conduits 175 and 176 alone may suffice to cool the fluid, no special cooling device being provided. The conduit 176 communicates with a passage 178, preferably formed integrally with the wall of the section 38 of the transmission housing, the inner end of the passage 178 communicating with an annular passage 179 surrounding the sleeve 140 and defined by packing rings 181 and 182. An aperture 183 in the sleeve 140 communicates with the annular passage 179 and with an axially extending passage 180 formed in the sleeve. The passage 180 communicates in turn through an orifice 186 with an annular chamber 184, the latter being defined by the wall 131 of the return guide unit and by the rear wall of the pump unit. Communication is afforded between this chamber 184 and the interior of the fluid clutch between the abutting annular faces of the pump and return guide units as will be apparent from the drawing.

The conduit 115 similarly extends through the wall of the section 39 of the transmission housing, communicating with a passage 187 leading to an annular passage 188 defined by the packing rings 182 and 189, communication being effected with a passage 190 in the sleeve 140 through the orifice 192. The passage 190 communicates with the interior of the fluid passage defined by the vanes within the return guide unit through an opening 185 formed in the latter.

It will be observed that the direction of the opening 185 is such that fluid will be forced under pressure through this opening from the associated passage in the return guide unit due to the natural motion of the fluid in the latter, whereas much less force is exerted on the fluid tending to cause it to flow between the abutting faces of the return guide and pump units. Thus it is unnecessary to provide a pump for the cooling system, the pressure difference tending to force fluid as indicated by the arrows in Figure 1 through the opening 185 and the passage 190 and through the conduit 175 to the cooler, the fluid returning through the conduit 176 and the passage 180. If it is found necessary to increase the rate of flow a separate pump for the cooling system may be provided.

It will be observed that the interior of the section 40 of the transmission housing is in communication with the clearance spaces between the shaft 66 and the sleeve 90 and between the sleeve 90 and the sleeve 140, whereby adequate lubrication of the several bearings associated with these members is ensured. It is nevertheless necessary that the lubricant and the fluid within the pump turbine units shall be isolated, and means are provided for this purpose. This means may include a packing ring 194, acting between the forward wall of the turbine unit and the member 55, and a second packing ring 195 between the return guide unit and the sleeve 90. A packing ring 196 is also associated with the bearing 142 between the forward wall of the pump unit and the sleeve 140 to prevent loss of fluid from the system. Packing at other points will of course be provided in accordance with conventional practice.

It will be appreciated that operation of the vehicle in reverse may be most readily obtained by the employment, at the rear of the transmission mechanism herein described, of a conventional single speed forward and reverse gear train, this gearing being located at any convenient point intermediate the variable speed mechanism and the vehicle driving wheels. With such an arrangement the variable speed mechanism will obviously function in the same manner whether the vehicle is proceeding forwardly or rearwardly, the shifting of the reverse gear train having no effect whatever on the function of the variable speed mechanism. If this reverse gearing is of the usual type affording a neutral position in which no torque is transmitted, the additional advantage of manual control of the drive permitting interruption thereof at the will of the operator in an emergency and independently of the function of the speed responsive clutch 11 is obtained.

Having thus described the invention, what is claimed as new and desired to be secured by Letters Patent is:

1. In a motor vehicle, the combination with a driving shaft, of a driven shaft, a positive low ratio driving connection between said shafts, said driving connection comprising a pinion carried by said driving shaft, a planet gear meshing with said pinion, a planet carrier for said gear coupled with said driven shaft, an orbit gear meshing with said planet gear, means retaining said orbit gear against rotation in one direction only, reverse to that of the driving shaft, a fluid pump operable by said driving shaft, a turbine operable by fluid from said pump and coupled with said planet carrier, and a normally stationary reaction member for returning fluid from said turbine to said pump.

2. In a motor vehicle, the combination with a driving shaft, of a driven shaft, gearing operatively connecting said driving shaft and said driven shaft to rotate the latter at reduced speed, a fluid pump operable by said driving shaft, a turbine driven by fluid from said pump, a normally stationary reaction member for returning fluid from said turbine to said pump, and means directly connecting said turbine and said driven shaft to rotate the latter at higher speeds, said gearing and said means affording separate paths for the transmission of torque between said driving and driven shafts.

3. In a motor vehicle, the combination with a driving shaft, of a driven shaft, a positive low ratio driving connection between said shafts, said driving connection comprising a pinion carried by said driving shaft, a planet gear meshing with said pinion, a planet carrier for said gear coupled with said driven shaft, an orbit gear meshing with said planet gear, means retaining said orbit gear against rotation in one direction only reverse to that of the driving shaft, and a torque multiplying, fluid coupling acting between said driving and driven shafts and operable automatically to vary the speed ratio therebetween in response to variation in the speed-torque characteristics of the driven shaft.

4. In a motor vehicle, the combination with a driving shaft, of a driven shaft, and mechanism connecting said shafts for rotation at continuously varying speed ratios in response to variation in the torque applied to the driven shaft, said mechanism comprising a planetary gear train interposed between said driving and driven shafts, a fluid pump coupled to said driving shaft, a turbine driven by fluid from said pump and coupled to said driven shaft, and a normally stationary reaction member for returning fluid from said turbine to said pump.

5. In a motor vehicle, the combination with a driving shaft, of a driven shaft, a planetary gear train connecting said shafts, means for retarding movement in one direction only of one element of said gear train to afford a fulcrum for the latter, whereby said driven shaft may be positively rotated from said driving shaft, and a torque multiplying, automatically selected, continuously variable speed ratio fluid coupling between said driving shaft and said driven shaft for rotating the latter at higher speeds.

6. In a motor vehicle, the combination with a driving shaft, of a driven shaft, a positive low ratio one-way driving connection between said shafts, and a second torque multiplying, fluid driving connection between said shafts automatically operable to establish higher ratios variable continuously in accordance with variation in the power ratio of the driving and driven shafts, said connections affording separate paths for the transmission of torque between said driving and driven shafts.

7. In a motor vehicle, the combination with a driving shaft, of a driven shaft, a positive low ratio one-way driving connection between said shafts, and a second torque multiplying driving connection between said shafts automatically operable to establish higher ratios variable continuously in accordance with variation in the power ratio of the driving and driven shafts, said second driving connection comprising a fluid pump operable by said driving shaft, a turbine operable by fluid from said pump, a reaction member for returning fluid from said turbine to said pump, and an operative connection between said turbine and said driven shaft, said connections affording separate paths for the transmission of torque between said driving and driven shafts.

8. In a motor vehicle transmission, the combination with a driving shaft, of a driven shaft, and means operatively connecting said shafts to drive said driven shaft at a speed ratio continuously and automatically variable from a minimum to a maximum ratio, said means including a gearing train affording a positive driving connection at the minimum speed ratio and a torque multiplying, fluid coupling operable automatically to increase the speed ratio in response to decrease in the load on the driven shaft.

9. In a motor vehicle transmission, the combination with a driving shaft, of a driven shaft, and means operatively connecting said shafts to drive said driven shaft at a speed ratio continuously and automatically variable from a minimum to a maximum ratio, said means including a planetary gearing train affording a positive driving connection at the minimum speed ratio and a fluid pump-turbine device acting at least in part in parallel with said gearing train to automatically and continuously increase the speed ratio to the maximum ratio, said pump-turbine device including a normally stationary fluid reaction member.

10. In a motor vehicle, the combination with a source of power, of a driven shaft, and a driving connection between said source and driven shaft for automatically varying the speed ratio therebetween from zero to a maximum, said connection including power transmission means affording a positive drive to said driven shaft at a predetermined speed ratio, said power transmission means including fluid coupling means responsive to variation in load on the driven shaft to automatically establish a torque multiplying drive to said driven shaft at continuously variable, higher speed ratios.

WALTER R. GRISWOLD.